Oct. 5, 1926.
J. SMITH ET AL
1,602,258
LOCKING MEANS FOR AUTOMOBILES
Filed April 19, 1926
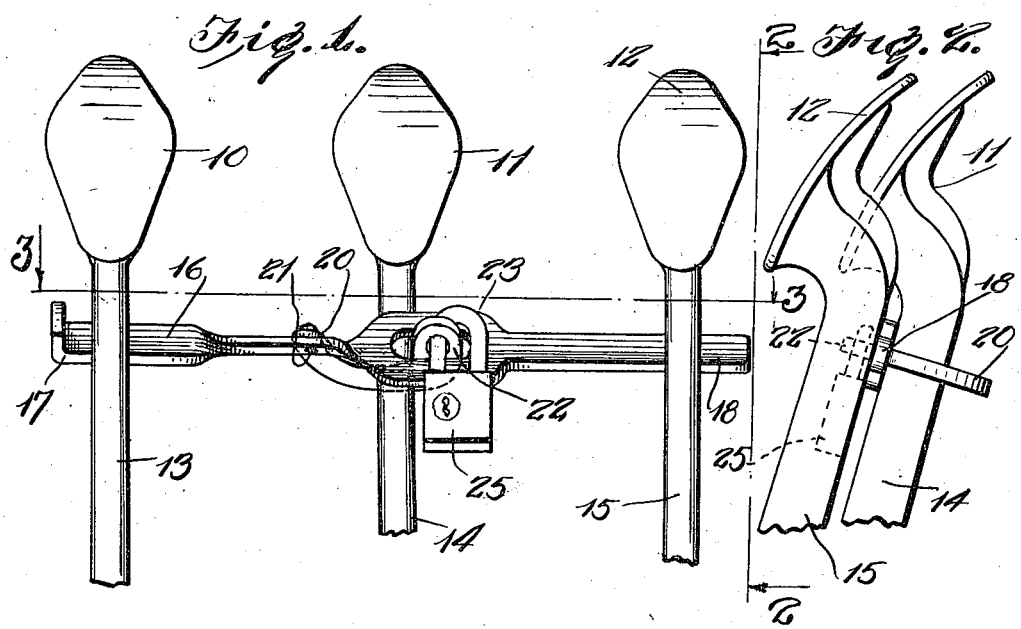
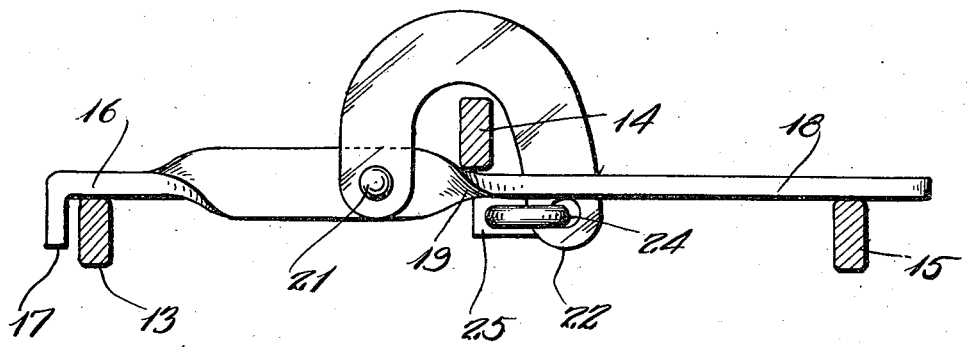
INVENTOR
Judd Smith
Jay M. Millering
BY
Walter W. Burns
ATTORNEY Patented Oct. 5, 1926.

1,602,258

UNITED STATES PATENT OFFICE.

JUDD SMITH AND JAY M. MILLERING, OF LA GRANDE, OREGON.

LOCKING MEANS FOR AUTOMOBILES.

Application filed April 19, 1926. Serial No. 102,974.

This invention relates to locking devices and particularly to a locking device for Ford automobiles.

Various locking devices have been applied to Ford automobiles for preventing their theft. These devices are all more or less successful but are all open to objections; most of which are open to the objection that they require permanent alterations or permanent attachments to the automobile.

The primary object of this invention is the provision of an improved locking device for the Ford automobile.

Another object of our invention is the provision of an improved locking device for the Ford automobile which will not be permanently attached to the same.

Another and further object of our invention is the provision of a locking device for a Ford automobile which will permit the automobile to be moved and steered by the steering wheel and thus complying with the various police regulations throughout the country, while still not permitting of the movement of the automobile by its own power.

Another and still further object of our invention is the provision of a lock for a Ford automobile which may be attached to the pedal levers in such a way that the low gear connection cannot be made in the transmission without engagement of the reverse mechanism of the transmission.

Referring to the drawing wherein we have illustrated an embodiment of our invention;

Fig. 1 is a front view of our invention attached to the pedal levers of a Ford automobile.

Fig. 2 is a side elevational view on the line 2—2 of Fig. 1.

Fig. 3 is a sectional view on the line 3—3 of Fig. 1.

The same reference characters refer to the same parts throughout the views of the drawing.

In Fig. 1, we have illustrated our invention attached to the pedal levers which control the transmission and brake mechanisms of a Ford automobile.

The numerals 10, 11 and 12 designate, respectively, the forward, reverse and brake pedals supported, respectively, by the pedal levers 13, 14 and 15. As is well known, the forward movement of the pedal 10 with its lever 13, places the transmission in low gear and when in a rearward position, it is in high gear, while at an intermediate position, it is in neutral. The lever 13 is normally spring held in a forward position.

The pedal 11 and its lever 14 when pushed forward, places the transmission in reverse to back the automobile when the engine is running. When in rear position, the lever 14 has no effect upon the transmission and is so held by a suitable spring, not shown.

The pedal 12 with the lever 15 is normally spring held in a rearward position and when pushed to a forward position, applies a transmission brake to check the movement of the automobile.

Our structure broadly comprises a means for attachment to the pedal levers already described and holding them in such a position that the motor cannot be effectually used to cause the automobile to be propelled.

The embodiment herein illustrated comprises primarily a bar having a flat portion 16 for engagement with the forward pedal, there being a rearwardly turned angular portion 17 to prevent disengagement of the locking means from the lever 13.

A flat portion 18 is provided, at the opposite end of the locking means, to engage the brake pedal lever 15.

Intermediate the flat portions 16 and 18, is a flat portion 19 for engagement with the reverse lever 14. The reverse lever 14 is held to the locking bar by means of a U-shaped member 20 which is pivoted at 21 to the main locking bar as clearly shown in Fig. 3. This U-shaped member 20 has an end 22 which extends through an opening 23 in the body of the bar as shown in Fig. 1. This end 22 is provided with an opening 24 through which the loop of a lock 25 is passed and secured in order to lock the locking bar and the levers in proper relation.

In applying our invention to lock the automobile, the flat portions 16 and 18 are placed behind the levers 13 and 15 and the portion 19 is placed in front of the lever 14. The pivoted U-shaped member 20 is now swung around to have its end pass through the opening 23 in position to have the lock 25 applied to the opening 24.

When the parts are in this position, the availability of the motor for power, is destroyed. If an unauthorized person should attempt to start the automobile, he would first probably move the emergency brake lever, not shown, so as to bring the forward lever 13 in neutral position. The engine might then be started. Any attempt to move the pedal 10 forward, would, however, cause the reverse lever 14 to be moved forward. This would result in the tightening of the low forward band and the reverse band and the consequent stalling of the motor. If the forward pedal should be let into high gear directly, this would also stall the motor.

The net result is that while, as already stated, the transmission can be placed in neutral and the automobile moved, it cannot be started under its own power.

While we have shown and described, in detail, an embodiment of our invention, we desire to have it understood that we do not limit ourselves to the exact showing and that modifications and changes may be made without departing from the spirit of our invention and within the scope of the appended claims.

Having described our invention what we claim is:—

1. Means for limiting the relative movements of the forward, reverse and brake pedal mechanisms of an automobile, comprising a bar for extending across the three pedal levers above and independent of the floor board and in position to contact with the levers, a pivoted member for holding one of the levers in close proximity to the bar and a key controlled lock for holding the pivoted member in place.

2. Means for limiting the relative movements of the forward, reverse and brake pedal mechanisms of an automobile, comprising a bar for extending across the three pedal levers above and independent of the floor board and in position to contact with the levers, a lever-holding member pivoted to the bar and having a portion passing through an opening in the bar and being provided with an opening in which a key controlled lock may be secured to hold the bar in place.

3. Means for limiting the relative movements of the forward, reverse and brake pedal mechanisms of an automobile, comprising a bar for extending across the three pedal levers above and independent of the floor board and in position to contact with the levers, a U-shaped lever-holding member pivoted at one side to the bar and having its other side constructed to pass in or out of an opening in the bar and being provided with an opening in which a key controlled lock may be secured to hold the bar in place.

4. Means for limiting the relative movements of the forward, reverse and brake pedal mechanisms of an automobile comprising a bar for extending across the three pedal levers above and independent of the floor board and in position to contact with the levers, a U-shaped lever-holding member pivoted at one side to the bar in position to hold the reverse lever in close proximity to the bar, the other side of the U-shaped member passing through an opening in the bar and being provided with an opening in which a key controlled lock may be secured to hold the bar in place.

In testimony whereof we hereunto affix our signatures.

JAY M. MILLERING.
JUDD SMITH.